US010150497B2

(12) United States Patent
Kato et al.

(10) Patent No.: US 10,150,497 B2
(45) Date of Patent: Dec. 11, 2018

(54) STEERING WHEEL

(71) Applicant: Autoliv Development AB, Vårgårda (SE)

(72) Inventors: Yousuke Kato, Yokohama (JP); Jinkeun Kim, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 95 days.

(21) Appl. No.: 15/103,363

(22) PCT Filed: Oct. 16, 2014

(86) PCT No.: PCT/JP2014/077510
§ 371 (c)(1),
(2) Date: Jun. 10, 2016

(87) PCT Pub. No.: WO2015/098248
PCT Pub. Date: Jul. 2, 2015

(65) Prior Publication Data
US 2016/0311457 A1    Oct. 27, 2016

(30) Foreign Application Priority Data

Dec. 26, 2013    (JP) .................................. 2013-270449

(51) Int. Cl.
*B62D 1/06* (2006.01)
*B29C 63/00* (2006.01)
(Continued)

(52) U.S. Cl.
CPC ............ *B62D 1/06* (2013.01); *B29C 63/0073* (2013.01); *B62D 1/065* (2013.01); *H05B 3/48* (2013.01);
(Continued)

(58) Field of Classification Search
CPC .. B62D 1/06; B62D 1/065; B62D 1/08; B27C 63/0073; H05B 3/48; H05B 3/34;
(Continued)

(56) References Cited

U.S. PATENT DOCUMENTS 4,547,655 A    10/1985  Kurata et al.
6,365,875 B1   4/2002   Kreuzer et al.
(Continued)

FOREIGN PATENT DOCUMENTS

JP    11-268652       10/1999
JP    H11268652 A     10/1999
(Continued)

OTHER PUBLICATIONS

PCT International Search Report—dated Jan. 13, 2015.
Recycling Process for Polyurethane Resin—Cao Minh Thai—Toshiba Review—vol. 56, No. 8, pp. 46 to 49.

*Primary Examiner* — Shawntina Fuqua
(74) *Attorney, Agent, or Firm* — Brinks Gilson & Lione

(57) ABSTRACT

A steering wheel providing minimal cost increase due to addition of a temperature adjustment function. The steering wheel, includes: a boss portion to be connected to a steering column; a grip portion to be gripped by a driver; and a spoke portion, which connects the boss portion and the grip portion to each other. The grip portion includes: a synthetic resin layer molded by a synthetic resin; a cored bar; a flexible porous material layer disposed on an outer peripheral surface side of the cored bar; and a heater element disposed on an outer surface of the porous material layer. The porous material layer and the heater element are covered by the synthetic resin layer.

5 Claims, 6 Drawing Sheets

(51) Int. Cl.
*H05B 3/48* (2006.01)
*B29K 75/00* (2006.01)
*B29K 105/04* (2006.01)
*B29L 31/30* (2006.01)

(52) U.S. Cl.
CPC ...... *B29K 2023/06* (2013.01); *B29K 2075/00* (2013.01); *B29K 2105/04* (2013.01); *B29L 2031/3047* (2013.01); *H05B 2203/017* (2013.01)

(58) Field of Classification Search
CPC ............... H05B 3/36; H05B 2203/017; H05B 2203/003; H05B 2203/014; H05B 1/0236; B29K 2023/06; B29K 2075/00; B29K 2105/04; B29L 2031/3047
See application file for complete search history.

(56) References Cited

U.S. PATENT DOCUMENTS

| | | |
|---|---|---|
| 9,393,985 B2 | 7/2016 | Cho et al. |
| 2002/0033389 A1 | 3/2002 | Sugiyama et al. |
| 2003/0111453 A1 | 6/2003 | Haag et al. |
| 2003/0218004 A1 | 11/2003 | Yoneyama et al. |
| 2010/0288073 A1 | 11/2010 | Shin et al. |
| 2011/0073582 A1 | 3/2011 | Morita et al. |
| 2012/0129623 A1 | 5/2012 | Gill et al. |
| 2012/0312796 A1 | 12/2012 | Cho et al. |
| 2013/0056455 A1 | 3/2013 | Onishi et al. |
| 2013/0062329 A1* | 3/2013 | Morita ............... H05B 3/34 219/204 |
| 2015/0122790 A1 | 5/2015 | Yamada et al. |
| 2015/0344061 A1 | 12/2015 | Uematsu et al. |
| 2015/0367875 A1 | 12/2015 | Nonoyama et al. |
| 2016/0311457 A1 | 10/2016 | Kato et al. |

FOREIGN PATENT DOCUMENTS

| | | |
|---|---|---|
| JP | 2007-153026 | 6/2007 |
| JP | 2013-60149 | 4/2013 |
| JP | 2013-129238 A | 7/2013 |
| JP | 2013-139203 | 7/2013 |
| JP | WO 2014/142083 A1 | 9/2014 |
| JP | 2016-094191 A | 5/2016 |
| WO | WO 2011/105765 A2 | 9/2011 |

* cited by examiner

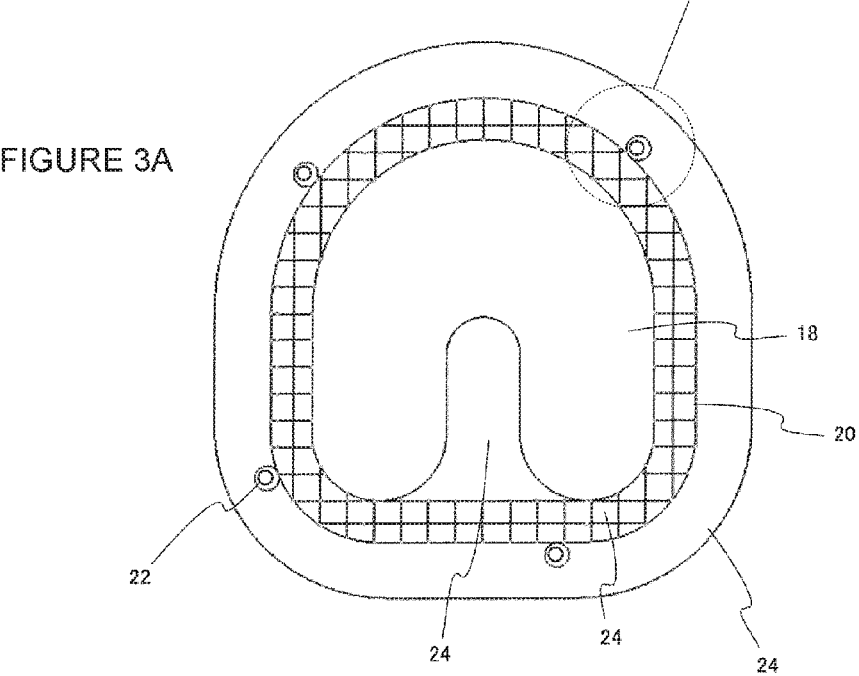

STEERING WHEEL

CROSS REFERENCE TO RELATED APPLICATIONS

This application claims priority to Japanese Application No. 2013-270449, filed on Dec. 26, 2013 and PCT/JP2014/077510, filed on Oct. 16, 2014.

FIELD OF THE INVENTION

The present invention relates to a structure of a steering wheel having a temperature adjustment function (heater and/or cooler function).

BACKGROUND OF THE INVENTION

In recent years, steering wheels having a temperature adjustment function (heater and/or cooler function) have been proposed and put into practical use for automobiles and any other vehicles. For example, a structure in which a heater element is disposed on the outer side of a cored bar has been proposed. Examples of conventional steering wheels with a heater function include a steering wheel disclosed in Japanese Patent Application Laid-open No. 2007-153026.

For a steering wheel having a heater function, it is important to efficiently transfer heat to a steering outer cover. As disclosed in Japanese Patent Application Laid-open No. 2013-139203, a structure in which a framework is formed as the surface of a rim and a heater element is disposed on the framework has been proposed. The invention disclosed in the previously mention reference, however, may give a driver a hard touch feeling of gripping the steering wheel, and the driver may often feel uncomfortable. Further, the structure and its manufacturing steps are complicated due to the increased number of components and the cost is inevitably increased.

The present invention has been made in view of the problems as described above, and it is an object of the present invention to provide a steering wheel capable of minimizing an increase in cost due to addition of a temperature adjustment function.

It is another object of the present invention to provide a steering wheel capable of efficiently and uniformly transferring heat (heating energy, cooling energy) to a steering wheel covering.

SUMMARY AND INTRODUCTORY DESCRIPTION OF THE INVENTION

In order to solve the above-mentioned problems, the present invention provides a steering wheel, including: a boss portion to be connected to a steering column; a grip portion to be gripped by a driver; and a spoke portion, which connects the boss portion and the grip portion to each other. The grip portion includes: a synthetic resin layer molded by a synthetic resin; a cored bar; a flexible porous material layer disposed on an outer peripheral surface side of the cored bar; and a heater element disposed on an outer surface of the porous material layer. Then, the porous material layer and the heater element are covered in the synthetic resin layer.

The word "contained" as used in the phrase "the porous material layer and the heater element are contained in the synthetic resin layer" includes the case where the synthetic resin layer completely encloses the porous material layer and the heater element as well as the case where the porous material layer and the heater element are partially exposed in a limited narrow range. Any type of synthetic resin can be used, including a foamable type and a non-foamable type such as thermoplastic, polypropylene, and urethane. The "outer peripheral surface of the cored bar" means an outer surface of the cored bar. The "outer surface of the porous material layer" means a surface of the porous material layer on the side opposite to the cored bar when the porous material layer is disposed on (wound around) the cored bar, that is, a surface of the porous material layer that corresponds to a surface closer to the hand of the driver gripping the steering wheel.

It is preferred that the grip portion be manufactured by a method including the steps of winding the porous material layer having the heater element around the cored bar of the grip portion so that the heater element is disposed on the outer surface of the porous material layer, and forming the synthetic resin layer, which forms an outer surface of the grip portion.

According to the present invention as described above, the steering wheel is structured such that the heater element is disposed in the vicinity of the cored bar of the grip portion through intermediation of the flexible porous material layer. Consequently, the heater element can be disposed at a distance from the cored bar by the thickness of the porous material layer, and the heater element is disposed at a position close to the surface of the steering wheel, thus improving temperature adjustment efficiency. Employing the flexible porous material layer enables the porous material layer to be easily mounted around the cored bar and also enables a satisfactory feeling of grip to be maintained even when the outer side of the steering wheel is enclosed by the synthetic resin layer. For example, a structure in which a heater element is placed on a frame structure unlike the porous material layer of the present invention may cause the driver to feel uncomfortable to grip the steering wheel even when the surface of the rim is covered by urethane or any other material. Further, in the present invention, gaps of the porous material layer are filled with the synthetic resin, and hence the porous material layer and the heater element can be tightly fixed to the cored bar with reliability. As described above, the structural features of the present invention enable the steering wheel with the temperature adjustment function, which may have a complicated structure in accordance with the prior art, to be manufactured at low cost.

It is preferred that the heater element in a state before the synthetic resin layer is formed be structured such that a surface of the heater element on a side opposite to the porous material layer is exposed without being covered by another member. Employing such a structure enables temperature to be adjusted uniformly and evenly as a whole and efficiently.

The "porous material" is a material having a structure containing a large number of air gaps inside. In the present invention, the porous material layer can be molded by a material having a foamed structure or an open-cell structure such as a cell-like structure. A foamed structure is advantageous in that manufacturing cost is easily suppressed to low levels. Further, employing an open-cell structure rather than a closed-cell structure enables the smooth and reliable filling of the porous material layer with the synthetic resin. Accordingly, the porous material layer is structured to have an air gap that is large enough for the synthetic resin to fill the grip portion.

As the porous material layer, a material having a three-dimensional network structure can be used as well. The "three-dimensional network structure" is a structure in which resin fibers such as threadlike polyethylene resins are partially fused in the state of being randomly entangled in contact with one another, and are molded into a foamed resin or a sponge. The three-dimensional network structure is advantageous in that gaps and flexibility of the porous material layer can be easily controlled through adjustment of pressure, temperature, or any other parameter in the fusion step.

BRIEF DESCRIPTION OF THE DRAWINGS

FIG. 3(A) and FIG. 3(B) are cross-sectional views of the grip portion in the direction X-X of FIG. 2.

FIG. 5(A) illustrates a single cell structure; and FIG. 5(B) schematically illustrates the relationship between the thickness t of the porous material layer and the size of a cell.

BACKGROUND

Figure 1:
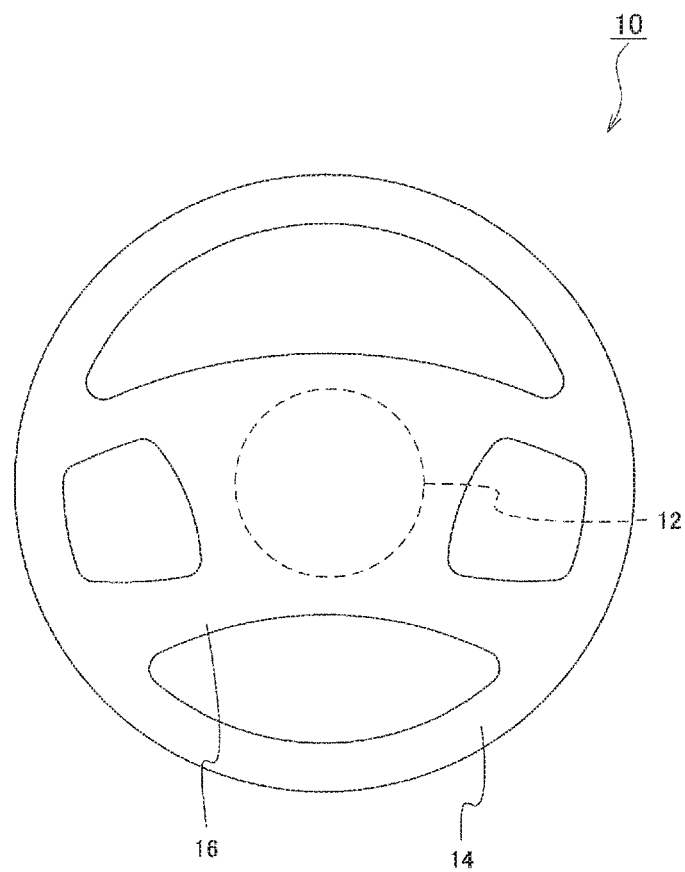
FIG. 1 is a plan view illustrating a steering wheel according to the present invention.

As illustrated in FIG. 1, the steering wheel 10 according to the present invention includes: a boss portion 12 to be connected to a steering column (not shown); the grip portion 14 to be gripped by a driver; and a spoke portion 16, which connects the boss portion 12 and the grip portion 14 to each other. The grip portion 14 corresponds to a portion generally called "rim", and can be said to be a portion to be touched by the driver in terms of a temperature adjustment function.

Figure 2:
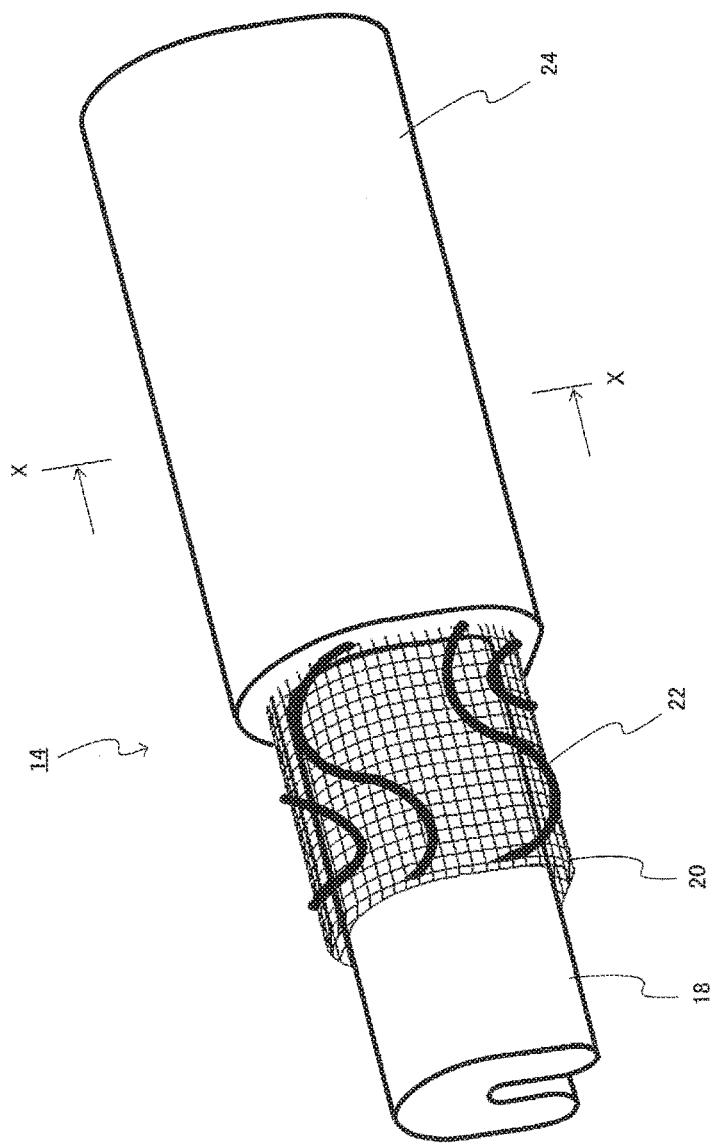
FIG. 2 is a perspective view illustrating a partial structure of a rim portion (grip portion) of the steering wheel according to the present invention, and for the sake of description, the inside of the grip portion is exposed.

As illustrated in FIG. 2 and FIG. 3, the grip portion 14 includes: a synthetic resin layer 24 molded by a synthetic resin such as urethane foam; a cored bar 18; a flexible porous material layer 20 disposed on an outer peripheral surface side of the cored bar 18; and a heater element 22 disposed on an outer surface of the porous material layer 20. The porous material layer 20 and the heater element 22 are covered by the synthetic resin layer 24. Then, the synthetic resin layer 24 enters air gaps of the porous material layer 20 so that the heater element 22 and the porous material layer 20 are fixed to the cored bar 18.

Examples of the porous material layer 20 that can be employed include a foamed structure, an open-cell structure, and a three-dimensional network structure. In any case, it is preferred that the porous material layer 20 be thick enough to separate the heater element 22 away from the cored bar 18. The synthetic resin layer 24 is thick enough to allow the synthetic resin to sufficiently spread into the porous material layer, and be flexible itself so that the feeling of touch is not impaired when the porous material layer 20 is enclosed by the synthetic resin layer 24.

As illustrated in FIG. 2(A), FIG. 3(A), and FIG. 3(B), it is desired that the heater element 22 in the state before the synthetic resin layer 24 is formed be structured such that a surface of the heater element 22 on the side opposite to the porous material layer 20 is exposed without being covered by another member. This structure prevents heat from being partially interrupted, thus allowing the temperature to be adjusted uniformly and evenly as a whole and efficiently. The heater element 20 includes a central heater wire 22a and a covering portion 22b that covers the heater wire 22a. As the heater wire 22a, a metal wire configured to generate heat when current flows therethrough can be employed.

Figure 4A:
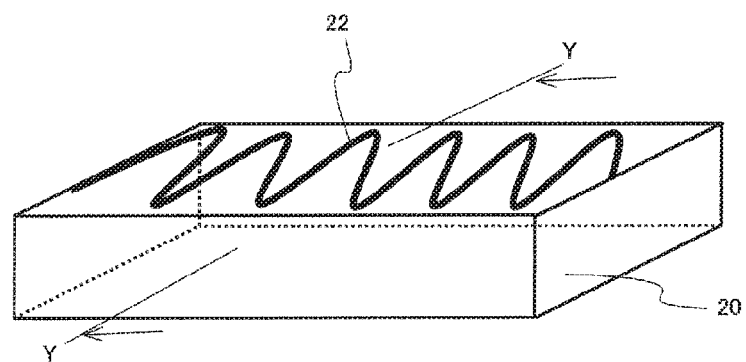
FIG. 4(A) is a perspective view conceptually illustrating the arrangement of a porous material layer and a heater element used in the present invention.
Figure 4B:
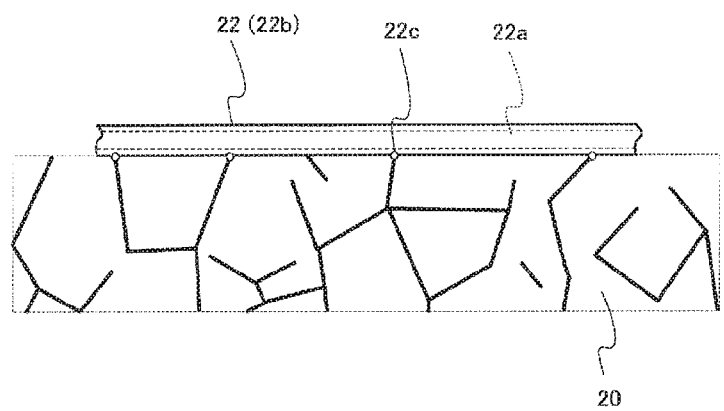
FIG. 4(B) is a cross-sectional view of the arrangement in the direction Y-Y of FIG. 4(A).

As illustrated in FIG. 4(A), the heater element 22 is fixed to the porous material layer 20 in a manner that the covering portion 22b is fixed to the surface of the porous material layer 20 by adhesion, fusion, or any other method. Note that, the heater element 22 is not required to be completely fixed at this time, and only needs to be held to the extent that the heater element 22 is not shifted relative to the porous material layer 20. In FIG. 4B, white circles 22c indicate adhesion points.

Figure 5A:
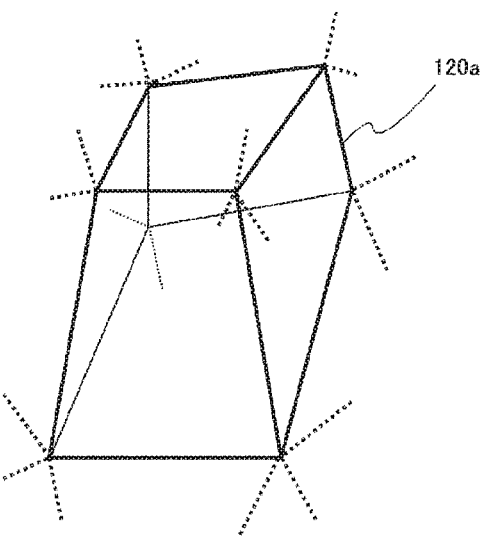
FIG. 5(A) and FIG. 5(B) are schematic views illustrating another porous material layer (open-cell structure) that can be used in the present invention.
Figure 5B:
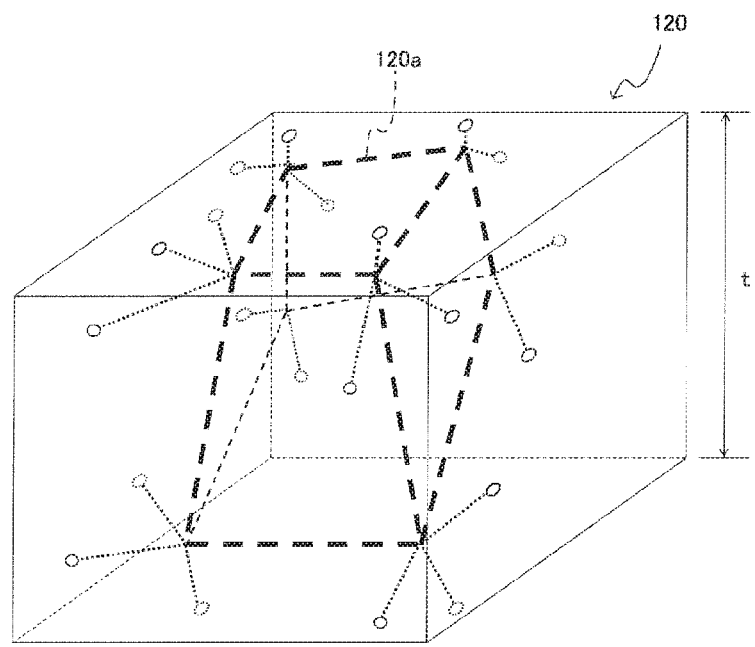

FIG. 5(A) and FIG. 5(B) are schematic views illustrating another porous material layer in the form of an open-cell structure 120 that can be used in the present invention. FIG. 5(A) illustrates a structure of a single cell 120a, and FIG. 5(B) conceptually illustrates the relationship between the thickness "t" of the porous material layer and the size of the cell 120a. The open-cell structure is a structure in which any surface forming each cell 120a, which is structured like a cell, is opened. A sheet of the open-cell structure can be molded with use of a polyester resin, a polyether resin, or any other resin. In regard to the number of cells, six to ten cells for example are contained in a length of 25 mm, and a single complete cell or a single incomplete cell (half cell) is contained in the thickness t of the sheet. It was confirmed that this structure was able to fix the porous material layer 20 and the heater element 22 to the cored bar 18 with sufficient adhesion strength.

Figure 6:
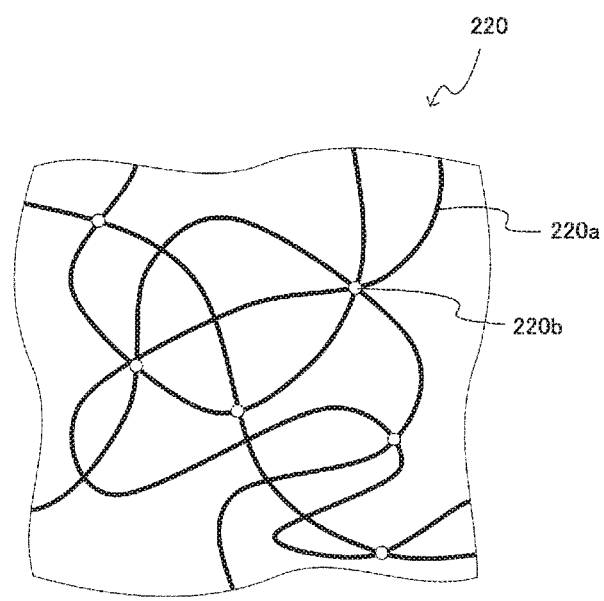
FIG. 6 is a schematic plan view illustrating a part of another porous material layer (three-dimensional network structure) that can be used in the present invention.

FIG. 6 is a schematic plan view illustrating a part of another porous material layer in the form of a three-dimensional network structure 220 that can be used in the present invention. As described above, the "three-dimensional network structure" is a structure in which resin fibers 220a such as threadlike polyethylene resins are partially fused in the state of being randomly entangled in contact with one another at points 220b, and are molded into a foamed resin or a sponge. Employing such a structure is advantageous in that adhesion density, gaps, and flexibility of the porous material layer can be easily controlled through adjustment of pressure, temperature, or any other parameter in the fusion step.

The steering wheel 10 according to the present invention is manufactured as follows. First, as illustrated in FIG. 4(A) and FIG. 4(B), the heater element 22 is fixed to the surface of the porous material layer 20 by fusion. Next, as illustrated in FIG. 2, the porous material layer 20 having the heater element 22 is wound around or placed onto the cored bar 18 of the grip portion 14 so that the heater element 22 is disposed on the outer surface of the porous material layer 20. Next, the grip portion 14 is inserted in a molding die, and as illustrated in FIG. 3(A), the synthetic resin 24 such as urethane is formed so as to enclose the whole component including the porous material layer 20. At this time, the resin of layer 24 reaches the cored bar 18 sufficiently via the gaps of the porous material layer 20, and consequently, the heater element 22 and the porous material layer 20 are tightly fixed to the cored bar 18.

In the steering wheel 10 of the present invention that has the above-mentioned structure and that is molded by the above-mentioned manufacturing method, the porous material layer 20 separates the heater element 22 away from the cored bar 18, thus avoiding the situation that most of heat generated by the heater element 22 is transferred in the direction of the cored bar 18 having high thermal conductivity, and enabling heat to be efficiently transferred to the steering surface side. In other words, the steering wheel 10 can be efficiently warmed (cooled) with low electric power. Further, the molding of the synthetic resin layer 24 can be completed by a single step, thus minimizing an increase in cost due to addition of the heater function.

Employing the flexible porous material layer 20 enables the heater element 22 to be easily disposed around the cored bar 18 and also enables a satisfactory feeling of grip to be maintained even when the outer side of the steering wheel 10 is enclosed by the synthetic resin layer 24.

While the embodiments of the present invention have been described, the present invention is not limited to the above-mentioned embodiments, and various design changes can be made within the range not departing from the technical concept described in the claims. For example, the present invention is applicable also to a steering wheel having a cooler function instead of a heater function.

The invention claimed is:

1. A steering wheel, comprising:
a boss portion adapted to be connected to a steering column;
a grip portion adapted to be gripped by a driver;
a spoke portion, which connects the boss portion and the grip portion to each other,
the grip portion including:
a synthetic resin layer formed by a synthetic resin;
a cored bar;
a flexible porous material layer disposed on an outer peripheral surface side of the cored bar, the flexible porous material layer forming a plurality of air gaps wherein the synthetic resin enters the air gaps of the porous material layer so that the heater element and the porous material layer are fixed to the cored bar; and
a heater element disposed on an outer surface of the porous material layer, the porous material layer and the heater element being covered by the synthetic resin layer.

2. A method of producing a steering wheel of the type having a boss portion adapted to be connected to a steering column; a grip portion adapted to be gripped by a driver; and a spoke portion, which connects the boss portion and the grip portion to each other, comprising the steps of:
providing a spoke portion;
providing the grip portion including;
a synthetic resin layer molded by a synthetic resin;
providing a cored bar;
disposing a heater element on an outer surface of a porous material layer;
disposing the porous material layer including the heater element around the cored bar of the grip portion so that the heater element is disposed on the outer surface of the porous material layer; and
forming the synthetic resin layer over the porous material layer and the heater element, which forms an outer surface of the grip portion, the flexible porous material layer forming a plurality of air gaps wherein the synthetic resin enters the air gaps of the porous material layer so that the heater element and the porous material layer are fixed to the cored bar.

3. The steering wheel according to claim 1 further comprising wherein the heater element in a state before the synthetic resin layer is formed is structured such that a surface of the heater element on a side opposite to the porous material layer is exposed without being covered by another material.

4. The steering wheel according to claim 1 further comprising wherein the porous material layer is formed by a material having a foamed structure or an open-cell structure.

5. The steering wheel according to claim 1 further comprising wherein the porous material layer is formed by a material having a three-dimensional network structure.

* * * * *